US010806148B2

(12) United States Patent
Rupak et al.

(10) Patent No.: US 10,806,148 B2
(45) Date of Patent: Oct. 20, 2020

(54) THICKENED PESTICIDE COMPOSITIONS, OPTIONALLY COMPRISING FERTILIZER

(71) Applicant: NOURYON CHEMICALS INTERNATIONAL B.V., Arnhem (NL)

(72) Inventors: Paul Rupak, St West Bengal (IN); HongBin He, Singapore (SG)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 16/076,350

(22) PCT Filed: Feb. 7, 2017

(86) PCT No.: PCT/EP2017/052613
§ 371 (c)(1),
(2) Date: Aug. 8, 2018

(87) PCT Pub. No.: WO2017/137383
PCT Pub. Date: Aug. 17, 2017

(65) Prior Publication Data
US 2019/0045790 A1 Feb. 14, 2019

(30) Foreign Application Priority Data
Feb. 10, 2016 (EP) ..................... 16155065

(51) Int. Cl.
*A01N 25/30* (2006.01)
*A01N 57/20* (2006.01)
*A01N 25/02* (2006.01)
*C05G 3/60* (2020.01)
*A01N 37/28* (2006.01)

(52) U.S. Cl.
CPC ............. *A01N 57/20* (2013.01); *A01N 25/02* (2013.01); *A01N 25/30* (2013.01); *A01N 37/28* (2013.01); *C05G 3/60* (2020.02)

(58) Field of Classification Search
CPC ........ A01N 25/30; A01N 61/00; A01N 25/02; A01N 33/14; A01N 57/20; C05G 5/20; C05G 3/60; C05G 3/70; C05F 11/10
See application file for complete search history.

(56) References Cited

U.S. PATENT DOCUMENTS

| 4,770,814 A | 9/1988 | Rose et al. | |
| 5,389,598 A * | 2/1995 | Berk | A01N 25/32 504/206 |
| 8,828,911 B2 * | 9/2014 | Zhu | A01N 25/30 504/366 |
| 2007/0027034 A1 * | 2/2007 | Tank | A01N 25/04 504/363 |
| 2007/0082819 A1 * | 4/2007 | Perry | A01N 33/04 504/136 |
| 2010/0056375 A1 * | 3/2010 | Jonsson | A01N 25/30 504/142 |
| 2010/0113274 A1 | 5/2010 | Hemminghaus et al. | |
| 2012/0231956 A1 | 9/2012 | Rainbird | |
| 2013/0143741 A1 | 6/2013 | Wright et al. | |

FOREIGN PATENT DOCUMENTS

| AU | 2015 202 443 A1 | 5/2015 |
| CN | 104814008 A | 8/2015 |
| WO | 01/32019 A1 | 5/2001 |
| WO | 2010/020599 A2 | 2/2010 |
| WO | 2010/036996 A2 | 4/2010 |
| WO | 2010/057886 A1 | 5/2010 |
| WO | 2012/076567 A2 | 6/2012 |

OTHER PUBLICATIONS

European Search Report issued in the counterpart European Application No. 16155065.2 dated Apr. 11, 2016.
Notification of Transmittal of the International Search Report and the Written Opinion of the International Searching Authority, or the Declaration from the International Bureau of WIPO for International Application No. PCT/EP2017/052613 dated Apr. 12, 2017.
Wan, L.S.C., "Interaction of Substituted Benzoic Acids with Cationic Surfactants", Journal of Pharmaceutical Sciences 1966, pp. 1395-1399, vol. 55, No. 12.
Wan, L.S.C., "Interaction of sodium and calcium salicylates with cationic surfactants", Journal of Pharmaceutical Sciences, Jun. 1967, pp. 743-747, vol. 56, No. 6.
Wan, L.S.C., "Interaction of salicylic acid with quaternary ammonium compounds", Journal of Pharmaceutical Sciences, Nov. 1968, pp. 1903-1906, vol. 57, No. 11.
Wan, L.S.C., "Anionic Surfactant Effect on Viscosity of Salicylic Acid-Cetrimide System", Journal of Pharmaceutical Sciences, Apr. 1972, pp. 642-645, vol. 61, No. 4.

* cited by examiner

*Primary Examiner* — Johann R Richter
*Assistant Examiner* — Danielle Sullivan
(74) *Attorney, Agent, or Firm* — Lorenz & Kopf, LLP

(57) ABSTRACT

Aqueous compositions are provided which consist of i) one or more of glufosinate, glufosinate salts, fertilizer, and mixtures thereof, ii) an alkyl amidoamine, and iii) a quaternary ammonium compound. Furthermore the such compositions in the preparation of agricultural formulations and the use of such formulations to treat a field, plants, or seeds.

20 Claims, No Drawings

THICKENED PESTICIDE COMPOSITIONS, OPTIONALLY COMPRISING FERTILIZER

This application is a national stage filing underqj 35 U.S.C. § 371 of PCT/EP2017/052613, filed Feb. 7, 2017, which claims priority to European Patent Application No. 16155065.2 filed Feb. 10, 2016, the contents of which are each incorporated herein by reference in their entireties.

FIELD OF INVENTION

The present invention relates to aqueous compositions comprising glufosinate (salts) or combinations of glufosinate (salts) and fertilizer, an alkylamidoalkylamine surfactant, and a surfactant, hereinafter an electrolyte composition. Such compositions are encountered in the agrochemical field wherein such compositions are dissolved in water and subsequent applied to treat fields or crop. Therefore, the electrolyte compositions of the invention are typically agrochemical formulations. Since the compositions are usually applied using a spraying technique, they are preferably sprayable agrochemical formulations. However, the compositions can also be used in other techniques such as fertigation and such as suspo concentrates, wherein part of the formulation is still in the form of suspended solids, typically because the electrolyte concentration is higher than its solubility in the formulation. Suitably the aqueous compositions of the invention are solutions.

BACKGROUND AND PROBLEM DESCRIPTION

Electrolyte compositions, such as compositions of glufosinate, adjuvants and optionally further auxiliary ingredients are conventionally sold as concentrated formulations. They are typically intended to be mixed and diluted with water prior to their end-use. Electrolyte compositions are often encountered in the agrochemical field wherein salts, such as herbicide salts, are typically used as an aqueous solution and/or dispersion, which is subsequently applied to treat fields or crop. Typically the compositions are sprayed.

The glufosinate compositions often contain adjuvants to stabilize their formulations, prevent drift during spraying, increase the efficacy of the glufosinate, often with the additional purpose of creating a better working solution and a better distribution of the pesticide when applied. Typically, the use of the adjuvant allows a lower dosing rate of the pesticide.

Surface active compounds are conventionally used as adjuvants, for example to change droplet size during spraying, or in order to allow the electrolyte to adhere on the area where it is functional, for example in foliage fertilizers, sometimes referred to as micronutrients, or to change the epidermal layer of the leaf surface, for example to permit pesticide entry. Fatty-alkyl amido alkylamines are often used for this purpose.

Regulatory requirements and economic reasons now dictate that electrolyte compositions are to be dealt with more carefully than in the past, particularly with less spillage, which causes a need for formulations that are more easily handled and controlled. It was found that high viscous formulations, with a viscosity >100 mPas, preferably >300 mPas, more preferably >400 mPas, and most preferably >500 mPas provide such required handling improvement. The viscosity can be so high that a gel is formed, which may be desired for certain uses, but in an embodiment the viscosity is <10000 mPas. Suitably the high viscous formulations remain their viscosity, also when the product is diluted.

In WO 2010/057886 electrolyte compositions are disclosed wherein alkoxylated gel forming surfactants are used. They are combined with fatty-alkyl amido alkylamines to reduce actual gel formation.

In US 2013/0143741 herbicidal compositions are disclosed wherein gel-forming polymers are used and optionally an alkoxylated surfactant is added to improve the efficacy of the herbicide.

WO 2010/020599 discloses thickened glyphosate formulations by using at least one surfactant from a large range of surfactants, categorized in 6 classes.

WO 2001/032019 discloses a composition containing glufosinate and a mixture of an amidopolyamine obtained by reacting coco fatty acid and diethylenetriamine, and the methosulfate salt of methyl-quaternized tallow amido ethyl amine. There is no disclosure or suggestion to make high electrolyte formulations also comprising one or more fertilizers or to use unsubstituted quaternary amines.

However, the conventional solutions were found to be unsatisfactory, for economic reasons and because fertilizers could not be included. Further it is noted that conventional solutions involving the use of alkoxylates, particularly ethoxylates, may be undesired because ethoxylate production involves the use of ethylene oxide which is an extremely flammable gas and its mixtures with air are explosive.

Further it was found that there is a need for being able to combine pesticide and fertilizers in one aqueous solution. Many prior art formulations were found not to allow such combined formulations, since they would separate upon standing.

Accordingly there is a need for an alternative method to thicken formulations comprising pesticide, one or more fertilizers, and mixtures thereof. Suitably such thickened formulations are used for tank mixing by a farmer to make more dilute formulations. Whether diluted or not, suitably the thickened formulation comprising pesticide, and optionally one or more fertilizers, is applied to plants or seeds. Application to plants is preferably thru foliar contact, but application to soil, with subsequent uptake through roots is acceptable, particularly for fertilizer-containing compositions.

DESCRIPTION OF THE INVENTION

The inventors have surprisingly found alternative thickener formulations addressing the above-mentioned problems. The new formulations are based on glufosinate and/or one or more of its salts, the use of a combination of fatty-alkyl amidoalkylamines and quaternary ammonium compounds. In an embodiment the fatty-alkyl amidoalkylamines are not alkoxylated. In an embodiment the quaternary ammonium compounds are not alkoxylated. In an embodiment the quaternary ammonium compounds are not quaternized fatty-alkyl amidoamines. In an embodiment the fatty-alkyl amidoalkylamine is neutralized. In an embodiment the fatty-alkyl amidoalkylamine is neutralized with an acid. In an embodiment, the quaternary compound does not contain amido groups in order to make more cost-effective glufosinate formulations with high viscosity and improved handling. In an embodiment the invention is not a composition containing glufosinate and a mixture of an amidopolyamine obtained by reacting coco fatty acid and diethylenetriamine, and the methosulfate salt of methyl-quaternized tallowamido ethyl amine. In an embodiment the invention is not a composition containing glufosinate and a mixture of an amidopolyamine obtained by reacting coco fatty acid and diethylenetriamine, and the chloride salt of methyl-quaternized tallowamido ethyl amine.

Such formulations can be used to make the desired high viscous compositions with a viscosity >100 mPas, preferably >300 mPas, more preferably >400 mPas, and most preferably >500 mPas, resulting in compositions with improved handling. In an embodiment the viscosity is <10000, suitably <6000, <3000, or <1000 mPas.

There is no suggestion in the prior art that the claimed specific combinations of glufosinate and/or one or more of its salts, with optionally neutralized, one or more fatty-alkyl amidoalkylamines and one or more quaternary ammonium compounds have beneficial properties allowing high viscosity over a wide concentration range of the electrolyte. Also there is no suggestion in the art that glufosinate and/or one or more of its salts, and fertilizers can be combined in such formulations. The combined formulations bring economic advantages but also the efficacy of the pesticide can be improved, presumably, but this is an unproven theory, because the fertilizer increases the plants uptake of the glufosinate.

Hence in a first aspect, the present invention relates to an aqueous composition comprising
a) one or more electrolytes selected from glufosinate and/or one or more of its salts and optionally one or more fertilizer salts,
b) one or more amidoalkylamines of the formula (1)

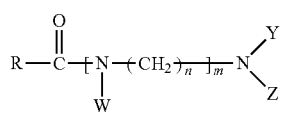

(1)

wherein R is a linear or branched, saturated or unsaturated alkyl group having 2-22 carbon atoms, m is 0-7, n is 2-6, W and Y are independently chosen from H, hydroxyl, an alkyl group having 1-4 carbon atoms, a benzyl group, -(AO)sH, where AO is an alkyleneoxy group having 2-4 carbon atoms, and s is on the average 1-30, and an acyl (R'C=O) group where R' is a linear or branched, saturated or unsaturated alkyl group having 2-22 carbon atoms,
c) one or more quaternary ammonium compounds having the structure of formula (2):

$$R^1R^2R^3R^4N^+X^-$$ (2)

wherein $R^1$, $R^2$, $R^3$, and $R^4$ are independently selected from saturated or unsaturated, linear or branched, substituted or unsubstituted, alkyl, aralkyl, or alkenyl groups comprising from 1 to 30 carbon atoms, whereby at least one of $R^1$, $R^2$, $R^3$, and $R^4$ is a $C_4$-$C_{30}$ group, and $X^-$ is an anion from an inorganic or organic acid. The fatty amine quaternary may contain ethoxy and/or propoxy groups. One or more of $R^1$, $R^2$, $R^3$, and $R^4$ may be substituted and contain one or more hydroxyl substituents or ether linkage, (to be defined and formula to be added), including C-12 to C-22 fatty amine based quaternary ammonium compounds, and
d) water,
as defined in the claims. Preferably said aqueous composition is a concentrated composition, meaning a product comprising less than 95% by weight (% w/w) of water. In an embodiment the composition comprises less than 75% w/w, in another embodiment less than 60% w/w of water, and in yet another embodiment less than 50% w/w of water. In an embodiment the amount of water in the aqueous formulation is >1, >4, >12, and/or >24% w/w.

It is noted that an electrolyte composition is herein defined as being aqueous compositions comprising salts, that when contacted with water can dissociate into ions, in a concentration of 1 to 75% w/w, in an embodiment 15-65% w/w, in another embodiment 20-65% w/w, and yet another embodiment 30-65% w/w. The salt can be added "as-is" or be formed "in-situ", for example by adding the acid to an alkaline solution.

The compositions and formulations of the invention comprise an electrolyte in the form of glufosinate and/or one or more of its salts, optionally together with one or more fertilizer salts, which are suitably used in a concentration of from 10 to 750 g/l (calculated as glufosinate). In a specific embodiment glufosinate is present in an amount of 100 to 650 g/l. In another embodiment the glufosinate is present in an amount of 200 to 600 g/l.

In an embodiment the compositions and formulations of the invention comprise one or more water-soluble fertilizers. Water-soluble fertilizers include but are not limited to water-soluble nitrates, phosphates, sulfates, chlorides, cyanamides, urea, and mixtures thereof. The major three elements are nitrogen, potassium and phosphorus, the secondary elements, also called micronutrients, are calcium, sulfur, magnesium, and other elements such as boron, manganese, iron, zinc, copper, silicium, and molybdenum. Fertilizers enhance the natural fertility of the soil or replace the chemical elements taken from the soil by harvesting, grazing, leaching or erosion. Suitable artificial fertilizers are inorganic fertilizers formulated in appropriate concentrations and combinations supply three main nutrients: nitrogen, phosphorus and potassium (N, P and K) for various crops and growing conditions. N (nitrogen) promotes leaf growth and forms proteins and chlorophyll. P (phosphorus) contributes to root, flower and fruit development. K (potassium) contributes to stem and root growth and the synthesis of proteins. The common inorganic fertilizers include ammonia (82% nitrogen), NPK combinations, urea (46% nitrogen), superphosphate, mono and dibasic ammonium phosphates (containing nitrogen and phosphate), calcium ammonium nitrate, potassium chloride (muriate of potash). In an embodiment the fertilizer is or comprises a salt selected from nitrates, phosphates, sulfates, particularly ammonium sulfate (AMS) and epson salt, chlorides, cyanamides such as calcium cyanamide, and mixtures thereof. In an embodiment the fertilizer is AMS. Some of these fertilizers may also show herbicidal activity, such as calciumcyanamide. If present, a fertilizer is suitably used in an amount of 1 to 75% w/w of the final formulation. The combination of amidoamines of formula 1 and quaternary compounds of formula 2 was found to be particularly suitable to stabilize compositions comprising glufosinate and fertilizer. The glufosinate was efficiently taken up by the plant while the formulations remained surprisingly stable during handling and use.

The amidoalkylamines as used in the invention are compounds of the formula (1)

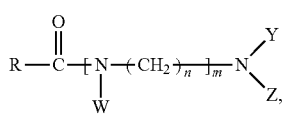

(1)

wherein R is a linear or branched, saturated or unsaturated alkyl group having 2-22 carbon atoms, in another embodiment 8-18 carbon atoms; m is 0-7, in another embodiment 0-3, in yet another embodiment, 1-3; n is a number 2-6, in another embodiment 2-3; W and Y are independently chosen from H, hydroxyl, an alkyl group having 1-4 carbon atoms, in another embodiment 1-2 carbon atoms and in still another embodiment 1 carbon atom, a benzyl group, -(AO)$_s$H, where AO is an alkyleneoxy group having 2-4 carbon atoms, in another embodiment 2 carbon atoms, and s is on the average 1-30, in another embodiment 1-20 and in still another embodiment 5-15; Z is H, hydroxyl, an alkyl group having 1-4 carbon atoms, in another embodiment 1-2 carbon atoms and in another embodiment 1 carbon atom, a benzyl group, (AO)$_s$H, where AO is an alkyleneoxy group having 2-4 carbon atoms, in another embodiment 2 carbon atoms, and s is on the average 1-30, in another embodiment 1-20 and in yet another embodiment 5-15, or an acyl (R'C=O) group, with R' being a linear or branched, saturated or unsaturated alkyl group having 2-22 carbon atoms. R' and R may be the same or different. When Z is the (R'C=O) group, m is preferably 1 to 7, in another embodiment 2-3. In an embodiment W, Y and Z are all not -(AO)$_s$H.

A list of exemplary alkyl amidoamines includes, but is not limited to, C2 (acetic acid) amidoamine (DMAPA, dimethylamidopropylamine), C5 (NEO acid) amidoamine (DMAPA), C6 (butyric acid) amidoamine (DMAPA), C7 (caproic acid) amidoamine (DMAPA), C8 (caprylic acid) amidoamine (DMAPA), C9 (Nonanoic/Pelargonic acid) amidoamine (DMAPA), 010 (capric acid) amidoamine (DMAPA), 2EH (2-ethylhexyl acid) amidoamine (DMAPA), TOFA (toll oil fatty acid) amidoamine (DETA, diethylenetriamine) with 10-30EO, C9 (Nonanoic/Pelargonic acid) diethanol amide, and N,N Dimethyl C10 amide. Specific examples of compounds of formula (1) useful in the context of the present invention include, but are not limited to N-[3-(dimethylamino)propyl] (C$_{8-10}$)amide, N-[3-(dimethylamino)propyl]cocoamide and N-[3-(dimethylamino)propyl] (rape-seed)amide. In an embodiment the alkyl amidoamine is coco-amidopropylamine available from AkzoNobel as Adsee® C-70S.

Suitably the alkyl amidoamines of the invention are neutralized before they are used. The inorganic or organic acid used for this purpose is suitably selected from HCl, HCH$_3$SO$_4$, H$_2$SO$_4$, HBr, HI, H$_3$PO$_4$, HNO$_3$, H$_2$CO$_3$, CH$_3$CO$_2$H, and salicylic acid. Neutralization typically involves adding the acid to the alkyl amidoamines until the pH of the amine, or of the water phase of a 50/50 blend of alkyl amidoamine and water which was stirred for 5 minutes at room temperature, is between 6-8. For unknown reasons, it was observed that for glufosinate formulations were most efficiently thickened using alkyl amidoamines that were neutralized with salicylic acid. In an embodiment they are neutralized with salicylic acid.

The one or more quaternary ammonium compounds in the composition have the structure of formula (2):

$$R^1R^2R^3R^4N^+X^- \quad (2)$$

wherein $R^1$, $R^2$, $R^3$, and $R^4$ are independently selected from saturated or unsaturated, linear or branched, substituted or unsubstituted, alkyl, aralkyl, or alkenyl groups comprising from 1 to 30 carbon atoms, whereby at least one of $R^1$, $R^2$, $R^3$, and $R^4$ is a $C_4$-$C_{30}$ group, and $X^-$ is an anion from an inorganic or organic acid. The compounds may contain one or more of either or both ethoxy and/or propoxy groups. One or more of $R^1$, $R^2$, $R^3$ and $R^4$ may be substituted and contain one or more hydroxyl substituents or ether linkage. One or more of $R^1$, $R^2$, $R^3$, and $R^4$ may be substituted and contain one or more amido linkages. One or more of $R^1$, $R^2$, $R^3$, and $R^4$ may contain an amido linkage. However, for economic reasons it can be preferred to use a quaternary compound wherein $R^1$, $R^2$, $R^3$, and $R^4$ are not substituted. Such quaternaries are more economical in use and more readily available.

Any source can be used to provide the R groups of the amidoalkylamine of formula (1) or the quaternary ammonium compound of formula (2). Suitably one or more of the R groups is/are derived from a natural source. Suitably the $C_4$-$C_{30}$ group is derived from a natural source. Preferred natural sources are oils and fats, such as oils and fats from land animals, marine animals, and plants. Sources of fat and oils from land animals include butterfat, depot fat, lard oil, neat's foot oil, and tallow (such as from beef or mutton). Sources of fat and oils from marine animals include cold-liver oil, herring oil, menhaden oil, sardine oil, sperm oil, and whale oil. Sources of fats and oils from plants include babassu oil, castor oil, cocoa butter, coconut oil, corn oil, cotton seed oil, linseed oil, mustard oil, neem oil, niger-seed oil, oiticica oil, olive oil, palm oil, palm-kernel oil, peanut oil, perilla oil, poppy-seed oil, rapeseed oil, safflower oil, sesame oil, soybean oil, sunflower-seed oil, tall oil, tung oil, and wheat germ oil.

In one embodiment, suitable oils and fats are selected from the group consisting of coconut, soybean (soya), tallow, palm, palm kernel, rapeseed, lard, sunflower, corn, safflower, canola, olive, peanut, and combinations thereof. In another approach, the suitable oils and fats are selected from the group consisting of soybean oil, tallow or coconut oil, such as fully or partially hydrogenated soybean oil, fully or partially hydrogenated tallow, or fully or partially hydrogenated coconut oil. In some approaches, the fatty acid is fully or partially hydrogenated tallow, and in certain approaches, the source of the fatty acid is fully hydrogenated tallow. To make amines from an acid, the acid is typically conventionally converted into the corresponding nitrile and then conventionally converted to an amine, suitably a tertiary amine. However for products comprising amido linkages the acids can be reacted with alkyldiamines or polyalkylpolyamines in a conventional fashion. To produce quaternary ammonium compounds from the amines, the amines are typically quaternized using conventional means such as alkyl halides and alkyl methosulfates.

Suitable fatty acids may include saturated acids such as isovaleric acid, valeric acid, caproic acid, enanthic acid, caprylic acid, pelargonic acid, capric acid, lauric acid, tridecylic acid, myristic acid, pentadecylic acid, palmitic acid, margaric acid, stearic acid, arachidic acid, phytanic acid, behenic acid, lignoceric acid, cerotic acid and montanic acid; or monounsaturated acids such as caproleic acid, palmitoleic acid, oleic acid, vaccenic acid, elaidic acid, brassidic acid, erucic acid, and nervonic acid; diunsaturated acids such as linoleic acid; triunsaturated acids such as eleosteric acid and linolenic acid; and tetraunsaturated acids such as arachidonic acid. In some approaches, the fatty acids are stearic acid, arachidic acid, phytanic acid, behenic acid, lignoceric acid, cerotic acid, montanic acid, oleic acid, vaccenic acid elaidic acid, brassidic acid, erucic acid, nervonic acid, linoleic acid, eleosteric acid, linolenic acid, and arachidonic acid. In yet other approaches, the suitable fatty acids are selected from the group consisting of stearic acid, oleic vaccenic acid, elaidic acid, linoleic acid, eleosteric acid, linolenic acid.

One or more, such as two or more, three or more, or all four of $R^1$, $R^2$, $R^3$, and $R^4$ is/are a linear or branched alkyl or alkenyl radical(s) comprising C1-C30, such as C4-C30, or C10-C30. In some approaches, one or more, such as two or more, three or more, or all four of $R^1$, $R^2$, $R^3$, and $R^4$ comprise at least C6, at least C8, such as at least 012, or C12-C18. In other approaches, one or more, such as two or more, three or more, or all four of $R^1$, $R^2$, $R^3$, and $R^4$ comprises a C12-C30 group. In one aspect, at least one, at least two, at least three, or all four of $R^1$, $R^2$, $R^3$, and $R^4$ is/are a C12-C18 linear or branched alkyl or alkenyl radical. In an embodiment at least two of $R^1$, $R^2$, $R^3$, and $R^4$ are lower alkyl with 1-4 carbon atoms. In one approach, one or more of $R^1$, $R^2$, $R^3$, and $R^4$ may be an aralkyl group. Such aralkyl group may be derived from non-natural resources, such as a resin or a rosin. Preferably quaternary ammonium compound is free of aryl functionality.

One or more of $R^1$, $R^3$, and $R^4$ may be saturated or unsaturated. The $R^1$, $R^2$, $R^2$, $R^3$, and $R^4$ groups each may have an iodine value of 5-30. One or more of $R^1$, $R^2$, $R^3$, and $R^4$ may be hydrogenated, such as partially or fully hydrogenated. In some approaches, one or more, such as two or more, three or more, or all four of $R^1$, $R^2$, $R^3$, and $R^4$ may be fully hydrogenated. In yet other approaches, one or more, such as two or more, three or more, or all four of $R^1$, $R^2$, $R^3$, and $R^4$ may be fully or partially hydrogenated linear or branched alkyl or alkenyl radicals comprising C18, such as fully hydrogenated radicals comprising C18, such as fully hydrogenated C18 radials derived from oleic acid.

In one embodiment, one or more of $R^1$, $R^2$, $R^3$, and $R^4$ is substituted with an OH function, such as in acids derived from castor oil.

In one embodiment the quaternary ammonium compounds of formula (2) have one or more of $R^1$, $R^2$, $R^3$, and $R^4$ with an amido function, such as in amidoalkylamines. In an embodiment the quaternary ammonium compound is a product of formula (1) which was quaternized in a conventional way. Therefore, in an embodiment the compounds b) and c) of the invention are provided in the form of an amidoalkylamine of formula (1) which is partially quaternized. In an embodiment the compounds b) and c) of the invention are provided in the form of an amidoalkylamine of formula (1) which was quaternized for 2% ww, 5% w/w, 10% w/w, 20% w/w, 30% w/w, or more, up to 98% w/w, 95% w/w, 90% w/w, 80% w/w, 70% w/w, or less, whereby the percentage is based on the total amount of compounds b) and c).

The quaternary ammonium compound of formula (2) may comprise compounds which are ethoxylated, propoxylated and/or butoxylated. In some approaches the fatty amine quaternary comprises about 1 to about 30 alkoxy units, or about 1 to about 20 alkoxy units, such as about 1 to about 15 alkoxy units, or about 1 to about 10 alkoxy units. In one aspect such alkoxy groups are ethoxy groups. In other aspects, the fatty amine quaternary comprises from about 1 to about 10 propoxy units, such as from about 1 to about 5 propoxy units. In one approach, the number of ethoxy and propoxy groups, is between 1 and 40, such as between 2 and 20. The fatty amine quaternary structure may be ethoxylated and/or propoxylated in any order, either randomly or blocky. In one approach, the fatty amine quaternary is a blocked alkoxylated quaternary ammonium compound. In another embodiment the quaternary ammonium compounds do not comprise alkoxy groups.

In an embodiment $R^1$ and/or $R^2$ is linear or branched, substituted or unsubstituted, alkyl group with 12 to 22 carbon atoms, with the remaining groups being lower alkyl groups with 1 to 4 carbon atoms. In an embodiment $R^1$ and $R^2$ are unsubstituted.

In formula (2), $X^-$ is the anion from an alkylating agent. Suitably it is selected from $Cl^-$, $CH_3SO_4^-$, $HSO_4^-$, $Br^-$, $I^-$, $H_2PO_4^-$, $NO_3^-$, $HCO_3^-$, and $CH_3CO_3^-$ groups. Should X be an anion with more than one charge, it can complex with a number of quaternary ammonium groups that correspond to its charge. For instance, one sulfate anion with a 2-charge can be complexed with two quaternary ammonium groups.

The fatty amine based quaternary ammonium compound of formula (2) is suitable an Arquad® product supplied by AkzoNobel. Suitably it is selected from di-fatty di-lower-alkyl quaternary ammonium compounds, such as dimethyl didecyl ammonium chloride, dimethyl dicycloalkyl ammonium chloride, dimethyl dicoco ammonium chloride, dimethyl dilauryl ammonium chloride, dimethyl distearyl ammonium chloride, dimethyl ditallow alkyl ammonium chloride and corresponding salts with other anions. In an embodiment the quaternary ammonium compound is selected from fatty tri-lower-alkyl quaternary ammonium compounds, such as trimethyl decyl ammonium chloride, trimethyl cycloalkyl ammonium chloride, trimethyl coco ammonium chloride, trimethyl lauryl ammonium chloride, trimethyl stearyl ammonium chloride, trimethyl tallow alkyl ammonium chloride and corresponding salts with other anions.

In an embodiment the quaternary ammonium compound is selected from dimethyl dicoco ammonium chloride and methyl benzyl dicoco ammonium chloride. In another embodiment it is a C16 trimethyl ammonium chloride (sold as Adsee® 1629 by AkzoNobel).

The water can be of any source. In an embodiment it is well water or city water. In another embodiment it is water collected from precipitation.

Depending on the intended way of application of the electrolyte formulation, the electrolyte concentration may differ. In the electrolyte compositions of claim 1 the pesticide and/or combination of pesticide and fertilizer is suitably present in an amount of from 1 to 75% w/w, or in an amount of from 2 to 70% w/w, or in an amount of from 3 to 65% w/w, whereby the amount of electrolyte is calculated as pure electrolyte.

The alkylamidoamines are suitably used in an amount of from 5 to 400, in an embodiment from 10 to 300, in another embodiment from 20 to 200 g/l in the concentrated compositions.

The quaternary ammonium compounds are suitably used in an amount of 5 to 400, in an embodiment from 10 to 300, in another embodiment from 20 to 200 g/l in the concentrated compositions.

The concentrations of the different compounds in the electrolyte composition are preferably such that (i) the concentrated composition is a viscous formulation having the desired viscosity, and which can be diluted with water to form viscous agrochemical ready-to-use-formulation, while having an as small as possible volume for transportation and storage purposes, and (ii) that the agrochemical ready-to-use formulation contains the suitable amount of the agrochemically active ingredients.

In another aspect the present invention relates to a method of preparing an agrochemical formulation comprising combining the above-described pesticide, with optional fertilizer, compositions with a sufficient amount of an aqueous medium to obtain the electrolyte-containing formulation which is suitable for being used, i.e. applied to fields or plants. The aqueous medium is preferably water, for example tap water or rain water. The diluted compositions should have a concentration of the pesticide and/or fertilizer that makes it suitable for end-use, i.e. for fertilizing or treating plants or seeds, preferably for fertilizing or treating plants. In an embodiment an electrolyte formulations is diluted to lower concentration, suitably with water, to obtain viscous agrochemical formulations of pesticide and/or fertilizer containing of from 0.1 to 250, more preferably from 0.5 to 150, even more preferably from 1 to 100 g/l, the amount of electrolyte being calculated as pure electrolyte. For crop field spray applications, a conventionally used total spray rate is 200 litres/hectar, and the typical recommended treat rate of electrolyte is from 1 to 5 kg electrolyte/ha, resulting in a preferred electrolyte concentration in the agrochemical formulation of from 0.5 to 2.5 wt % (5 to 25 g/l), expressed as the weight of the electrolyte in the spray solution.

The present invention also relates a method of treating a field or a plant or seed by distributing the composition of the invention over said field or contacting said plant or seed with a composition according to the invention, preferably a field or plant is treated. In a further aspect, a part of the plant or seeds is contacted with a composition or agrochemical formulation of the invention, at an amount sufficient for the electrolyte to obtain the desired agrochemical effect on the plant or seed. Preferably, the step of contacting a plant or seed with the agrochemical formulation involves spraying the agrochemical formulation onto the plant or seed.

The electrolyte compositions and agrochemical formulations may comprise further auxiliary ingredients. Auxiliary ingredients include defoamers like the SAG products from Momentive Performance Chemicals, USA, the BC Antifoam products of KCC Brasilon, Foamaster of Cognis, Rhodisol of Rhodia, Break Thru of Degussa, and/or the Surfynol® DF series and the Airase® SSDL™ products of Air Products may be included in the formulation. If used, defoamers are suitably used in an amount of from 0.01 to 10, in an embodiment from 0.05 to 1, in another embodiment from 0.1 to 0.5 g/l in the concentrated compositions. Other auxiliary ingredients include pesticides mentioned above that are not in the salt form, particularly if they are water-soluble and particularly when they lead to a higher ionic strength in the formulation, such as phenoxy-acid-type herbicides, including a product such as 2,4-D (2,4-dichlorophenoxy). Auxiliary ingredients, if present, are suitably comprised in an amount of from 1 to 50% of the total formulation.

The invention will now be further illustrated with reference in the following example which is provided for illustrative purposes only. Throughout this document, unless indicated differently, the weight percentages of the compositions are based on the total weight of the composition, whereby the total weight of the composition is 100 wt %. The term water-soluble is used for materials that dissolve in an amount of at least 1 g per liter of demineralized water at 25° C. Where used, the term "consisting" also embraces "consisting substantially", but may optionally be limited to its strict meaning of "consisting entirely".

Throughout the description and claims of this specification, the words "comprise" and "contain" and variations of the words, for example "comprising" and "comprises", mean "including but not limited to", and do not exclude other moieties, additives, components, integers or steps. Moreover the singular encompasses the plural unless the context otherwise requires: in particular, where the indefinite article is used, the specification is to be understood as contemplating plurality as well as singularity, unless the context requires otherwise.

Where upper and lower limits are quoted for a property, for example for the concentration of a component, then a range of values defined by a combination of any of the upper limits with any of the lower limits may also be implied.

It will also be appreciated that features from different aspects and embodiments of the invention may be combined with features from any other aspect and embodiment of the invention.

Material and Methods

Adsee 1629=C-16 fatty amine based quaternary ammonium salt provided by Akzo Nobel, Sweden.

Adsee C70S=N-[3-(dimethylamino)propyl]cocoamide (Coco-APA) supplied by AkzoNobel Surface Chemistry, Sweden (provided as 70% active), neutralized with salicylic acid.

Glufosinate-NH4 was received from Hangzhou Tianlong Co., Ltd.

Procedure

In the examples formulations as indicated were prepared by measuring the ingredients and combining them with water, whereby the amount of water used was the amount needed to achieve a total volume of 1 liter. Hereafter the mixture was stirred until all solids were fully dissolved, where desired after heating to 40° C., and subsequent the solution was cooled to room temperature. The viscosity of the resulting solutions was measured at a temperature of 20° C. (unless indicated differently), using a Brookfield viscometer model DV-I with a S34 spindle at a speed of 30 rpm. The viscosity observed is noted in the tables.

Example 1, Evaluation in Formulations Comprising Glufosinate-NH4

| Composition | CE #1 | #2 | #3 | #4 |
|---|---|---|---|---|
| Glufosinate-NH4 | 200 g | 200 g | 200 g | 200 g |
| Adsee 1629 | 150 g | 120 g | 90 g | 60 g |
| Adsee C-70S | 0 | 30 g | 60 g | 90 g |
| PEG | 30 g | 30 g | 30 g | 30 g |
| Water | Up to 1 L | Up to 1 L | Up to 1 L | Up to 1 L |
| Viscosity (mPas) at 25° C. | 30 | 50 | 180 | 550 |

The formulations of the glufosinate in these examples are more cost-effective as a mixture of an amidopolyamine obtained by reacting coco fatty acid and diethylenetriamine, and the methosulfate salt of methyl-quaternized tallowamido ethyl amine.

What is claimed is:

1. An aqueous composition comprising
    a) one or more electrolytes selected from glufosinate and glufosinate salts and optionally further comprising fertilizer salts,
    b) N-[3-(dimethylamino)propyl] cocoamide present in an amount of from 21 to 63 g actives/one liter of water,
    c) C16 trimethyl ammonium chloride present in an amount of from 60 to 120 g actives/one liter of water, and
    d) water.

2. A composition of claim 1 with a viscosity from 100 to 10000 mPas.

3. A composition of claim 1 comprising from 1 to 75% by weight of glufosinate and/or one or more of its salts, or a mixture of glufosinate and/or one or more of its salts with the fertilizer.

4. A composition of claim 1 wherein the N-[3-(dimethylamino)propyl] cocoamide is neutralized with salicylic acid.

5. A composition of claim 1 comprising glufosinate and/or one or more of its salts, and the fertilizer.

6. A process to make compositions of claim 1 by mixing the ingredients.

7. A process to make an aqueous agrochemical formulation by diluting a composition of claim 1.

8. An agrochemical formulation obtained by the process of claim 7.

9. A method of treating a field, plant, or seed by applying an effective amount of the agrochemical formulation of claim 8 to the field, plant or seed.

10. A composition of claim 1 with a viscosity from 50 to 550 mPas.

11. A composition of claim 1 further comprising polyethylene glycol.

12. A composition of claim 11 wherein the polyethylene glycol is present in an amount of 30 g actives/one liter of water.

13. A composition of claim 1 wherein:
the N-[3-(dimethylamino)propyl] cocoamide is present in an amount of 63 g actives/one liter of water; and
the C16 trimethyl ammonium chloride is present in an amount of 60 g actives/one liter of water.

14. A composition of claim 1 wherein:
the N-[3-(dimethylamino)propyl] cocoamide is present in an amount of 42 g actives/one liter of water; and
the C16 trimethyl ammonium chloride is present in an amount of from 90 g actives/one liter of water.

15. A composition of claim 1 wherein:
the N-[3-(dimethylamino)propyl] cocoamide is present in an amount of 21 g actives/one liter of water; and
the C16 trimethyl ammonium chloride is present in an amount of from 120 g actives/one liter of water.

16. An aqueous composition comprising:
a) one or more electrolytes selected from glufosinate and glufosinate salts and present in an amount of 200 g actives/one liter of water,
b) N-[3-(dimethylamino)propyl] cocoamide present in an amount of 21 to 63 g actives/one liter of water,
c) C16 trimethyl ammonium chloride present in an amount of 60 to 120 g actives/one liter of water,
d) water, and
polyethylene glycol,
wherein the composition has a viscosity of from 50 to 550 mPas.

17. A composition of claim 16 wherein the polyethylene glycol is present in an amount of 30 g actives/one liter of water.

18. An aqueous composition consisting of:
a) one or more electrolytes selected from glufosinate and glufosinate salts,
b) N-[3-(dimethylamino)propyl] cocoamide neutralized with salicylic acid,
c) C16 trimethyl ammonium chloride,
d) water, and
polyethylene glycol,
wherein the composition has a viscosity of from 50 to 550 mPas, and
wherein the C16 trimethyl ammonium chloride and the N-[3-(dimethylamino)propyl] cocoamide are present in a weight ratio of actives of about 6:1 to about 1:1, respectively, per one liter of water.

19. A composition of claim 18 wherein the polyethylene glycol is present in an amount of 30 g actives/one liter of water.

20. A composition of claim 19 wherein the C116 trimethyl ammonium chloride and the N-[3-(dimethylamino)propyl] cocoamide are present in a weight ratio of actives of about 1:1, respectively, and the viscosity is about 550 mPas.

\* \* \* \* \*